(12) United States Patent
Hannequin

(10) Patent No.: US 7,376,283 B2
(45) Date of Patent: May 20, 2008

(54) NOISE REDUCTION IN A DIGITAL IMAGE BY FACTORIAL ANALYSIS OF CORRESPONDENCES

(76) Inventor: Pascal Hannequin, Allée du Bouverat, 74290 Menthon Saint Bernard (FR)

( * ) Notice: Subject to any disclaimer, the term of this patent is extended or adjusted under 35 U.S.C. 154(b) by 714 days.

(21) Appl. No.: 10/497,254

(22) PCT Filed: Dec. 12, 2002

(86) PCT No.: PCT/FR02/04297

§ 371 (c)(1),
(2), (4) Date: May 28, 2004

(87) PCT Pub. No.: WO03/050760

PCT Pub. Date: Jun. 19, 2003

(65) Prior Publication Data

US 2005/0036703 A1    Feb. 17, 2005

(30) Foreign Application Priority Data

Dec. 12, 2001    (FR)    .................................. 01 16165

(51) Int. Cl.
*G06K 9/40*    (2006.01)
(52) U.S. Cl. ........................ 382/261; 382/264; 382/260
(58) Field of Classification Search .................... None
See application file for complete search history.

(56) References Cited

FOREIGN PATENT DOCUMENTS

WO    WO 01/72032 A1    9/2001

OTHER PUBLICATIONS

Hannequin et al "The determination of the number of statistically signifigant factors ect" Physics in Medicine and Biology Spet. 1989 1213-1227.*
Aebersold et al. "Quantitative interpretation of HRTEM images using multivariate statistics: the case f the (gamma, gamma')-interface in a NI base superalloy" Ultramicroscopy Feb. 1996 p. 171-189.*
Aebersold et al, "Quantitative interpretation of HRTEM images using multivariate statistics etc.", Ultramicroscopy, Feb. 1996, p. 171-189.
Hannequin et al, "The determination of the number of statistically significant factors etc.", Physics in Medicine and Biology, Sep. 1989, p. 1213-1227.
Schmidlin et al, "Application of factor analysis for scintigraphic picture processing", Proc. 4th Int'l Conf. on Inf. Proc. 1975, p. 80-90.
Hannequin et al, "Analysis of image sequences in nuclear medicine etc.", Journal de Medicine Nucleaire et Biophysique, 1989, p. 125-137.

* cited by examiner

*Primary Examiner*—Jingge Wu
*Assistant Examiner*—Sean Motsinger
(74) *Attorney, Agent, or Firm*—William H. Eilberg

(57) ABSTRACT

The invention concerns a method which consists in processing in a central unit (4) the digitized image (1) obtained by sensing noisy radiation. The image (1) is considered as a table of pixel intensity values, which is broken down into p elementary tables of n pixels so as to subsequently order them into a processing table with p lines of n columns; applying to said table a factorial analysis method, to deduce therefrom the n significant factors; then reconstituting a reconstructed processing table taking into account the most significant factors, and in deducing therefrom a reconstituted image wherein the high-frequency noise is reduced, maintaining a satisfactory contrast.

12 Claims, 4 Drawing Sheets

NOISE REDUCTION IN A DIGITAL IMAGE BY FACTORIAL ANALYSIS OF CORRESPONDENCES

TECHNICAL FIELD OF THE INVENTION

The present invention relates to methods and devices for filtering digitized images, in particular to methods and devices for eliminating noise in a digitized image.

Some images are very noisy, which reduces their legibility. This is the case, for example, of images obtained from low-level signals, in which the wanted signals are severely disturbed by interferences and other physical phenomena that degrade signal transmission.

This is also the case of certain images in the field of medical imaging, such as scintigraphy images.

In nuclear medicine, the scintigraphy technique consists in injecting patients with biological molecules marked by radioactive isotopes that emit gamma photons. The gamma photons are detected by a gamma camera.

The emitter particles injected into the human body emit gamma photons at random. The signals picked up depend, on the one hand, on the quantity of emissive particles in a given region and, on the other hand, on the emission conditions for each particle. In a scintigraphy image, which is an image of the distribution of gamma photons from an organism, each picture element or pixel is an integer and is the number of particles, i.e. the number of photons detected facing it. It is found that the distribution of these integer values around a mean value is a Poissonian distribution.

The Poissonian distribution is expressed by the formula:

$$Pr(X = k) = \frac{\mu^k e^{-\mu}}{k!}$$

Pr (X=k) is the probability of the pixel X taking the value k. $\mu$ is the mean value of the distribution.

FIG. 1 shows one example of a Poissonian distribution in which the mean $\mu$=5.

Another instance of a Poissonian distribution is the distribution of X-ray photons such as those used in tomodensitometry (i.e. in an X-ray scanner), which visualizes the anatomical structures of an organism using differences in the attenuation of X-rays by biological tissues.

In all cases, the images are affected by Poissonian noise, resulting from the random character of the emissions, and the relative magnitude of this noise is inversely proportional to the number of events detected. This is because the relative error of the measurement is given by the formula:

Relative error=[(variance) $(X)]^{1/2}$/mean$(X)$=
$\sqrt{\mu}/\mu=1/\sqrt{\mu}$ The relative error therefore varies in the opposite sense to the number of events detected.

To improve the legibility of an image, it is therefore only natural to reduce the noise, and to this end to increase the number of events detected.

A first way to do this is to acquire images over a longer time period. However, this may be difficult if the subject is moving, for example in radiology because of respiratory and cardiac movements. Moreover, increasing the image acquisition time ties up the sensing apparatus for longer, which raises serious problems in scheduling medical imaging.

A second way to increase the number of photons detected is to increase the flux of particles. In medical imaging, this implies increasing the radioactive dose injected or the flux of X-ray photons. However, this commensurately increases the dose of radiation to which the patient is exposed, which contradicts the principles of radio protection.

Finally, using more-efficient sensing devices may be envisaged, but this immediately gives rise to cost problems.

To illustrate the effect on image quality of the increased number of photons detected, FIG. 2 reproduces a real scintigraphy image of a subject, produced from signals received over three different periods: the left-hand image corresponds to reception for one minute, the center image corresponds to reception for five minutes, and the right-hand image corresponds to reception for ten minutes. The quality of the right-hand image is very much higher.

Poissonian noise clearly consists in a random variation between one pixel and the adjacent pixels, variation that is not related to the real difference in the concentration of emissive particles between the region facing the pixel concerned and the regions facing the adjacent pixels. This noise is therefore high-frequency noise, i.e. noise introducing sudden variations from one pixel to another in the sequence of the pixels of an image.

As it is often very difficult to increase the number of photons detected, the invention proposes to reduce the high-frequency noise contained in an image by using a particular filtering device.

Filtering images, with the aim of reducing the effect of noise, has already been proposed. A very large number of different filters has been proposed.

The simplest and best known type of filter replaces the value of each pixel by the mean of the values of the adjacent pixels. A Gaussian filter has also been proposed, which imparts a Gaussian spatial distribution weight to the adjacent pixels, and replaces the central pixel with a linear combination of the adjacent pixels.

The document WO 01/72032 describes one example, which defines particular coefficients for applying filtering and, where possible, at the same time preserves a certain contrast in the image.

The document also states the problem of all filters, whether weighted or not: all filters improve the signal to noise ratio, but at the cost of severely degrading the spatial resolution and the contrast of the image. This is because a filter calculating a weighted mean of a plurality of adjacent pixels obviously reduces sudden variations of intensity between adjacent pixels, and therefore reduces the effects of contrast.

By way of example, FIG. 3 depicts the processing of a real scintigraphy image by two filters: the left-hand view is an unfiltered raw image; the center view is the same image filtered by a 3×3 weighted filter; the right-hand view is the same image filtered by a 3×3 median filter, which replaces each pixel with the median of the adjacent pixels. It can be seen that the contours, in the filtered images, are not very sharp, as a result of the reduction in spatial resolution and contrast.

Filtering images by multivariate statistical analysis methods applied to a table of numbers each expressing the degree of luminosity of a corresponding pixel in a digitized image has also been proposed.

Thus, the document XP 002212651 AEBERSOLD, STADELMANN, ROUVIERE describes processing electron microscope images. This processing is applied by factorial analysis of correspondences to a table consisting of the pixels of the digitized image. The analysis is applied to the entire digitized image, seeking in the entire image the correspondence factors most representative of the image, i.e.

those that correspond to the highest eigenvalues, and then reconstructing the image on the basis of only these representative factors. Although in theory the method achieves high quality filtering of a given image, in practice it is not possible to adapt the filtering to the structure of the image to be filtered, as a result of which results are disappointing.

The document XP 001074312 HANNEQUIN, LIEHN, VALEYRE proposes applying factorial analysis of correspondences to a series of entire scintigraphy images, and suggests using the likelihood ratio test to determine the correspondence factors to be used to reconstruct the series of images. The method is again applied to the totality of the images. The results of such filtering are slightly improved, but remain disappointing in respect of certain image structures to be filtered.

The same problems are encountered in the documents XP 008007773 and XP 008007666, which apply statistical processing to the totality of an image.

There is therefore a need for a more efficient filtering device, that eliminates high-frequency noise without significantly reducing the resolution or the contrast of the image.

One problem common to all the filtering devices is the difficulty of adapting the filtering process to the structure of the image to be filtered. This is because the images do not all have the same structure, the structure differing as a function of the subject observed. It appears that although filters may generally be well adapted to a particular image, they are ill adapted to very different images. Tests have been carried out to adapt the filters as a function of the variations of the pixels, but these tests are not satisfactory.

SUMMARY OF THE INVENTION

Thus an object of the present invention is to enable efficient filtering, to produce images of high quality, using means that are particularly inexpensive.

In one particularly advantageous embodiment, the invention therefore proposes to adapt the filtering process not only to the general structure of an image, but also, and above all else, to the individual structure of basic portions of the image to be processed. Clearly this may significantly improve the contrast of the image.

Furthermore, according to the invention, this adaptation is preferably automatic, thereby minimizing the loss of information resulting from the filtering.

To achieve the above and other objects, the invention provides a method of processing a digitized image consisting of a table T of numbers $x_{(i,j)}$ each expressing the degree of luminosity of a corresponding pixel of rank i, j (for example, the number of particles detected in the corresponding pixel), the method comprising the reduction of high-frequency noise (for example Poissonian statistical noise) by the following steps:

a) decomposing the table T into a continuous series of p basic tables of the same dimensions each having n pixels, b) ordering the data from the series of basic tables into a processing table X of p rows and n columns, each row i being formed of the ordered sequence of the pixels from the $i^{th}$ basic table, d) effecting a multivariate statistical analysis on the processing table X, considering the n columns as variables, to extract therefrom n representative factors, f) generating a reconstituted processing table XR of numbers $xr_{(i,j)}$ using only the first q representative factors and restoring the absolute degree of luminosity, then generating a reconstituted table TR constituting the reconstituted digitized image in which the high-frequency noise has been reduced in this way, during the step f), the reconstituted processing table XR is reconstituted by reconstructing each row i independently of the others, taking into account only the factors having a meaningful weight with the row i.

In the present description and in the claims, the expression "multivariate statistical analysis processing" refers generally to all statistical analysis methods such as in particular analysis into main components with or without normalization, factor analysis with or without normalization, and factor analysis of correspondences.

Thanks to row-to-row reconstruction, the invention adapts the filtering process to each subset of the image, which considerably improves the result obtained.

One advantageous embodiment of the method uses a method of factorial analysis of correspondences, whereby:

d1) the transposed matrix $XN^T$ is calculated, d2) the square matrix that is the product of the normalized matrix XN and the transposed matrix $XN^T$ is calculated, d3) the square matrix $XN^TXN$ is diagonalized to extract therefrom n eigenvectors $u_k$ (with k from 1 to n) associated with n eigenvalues $vp_k$, d4) the coordinates of the p rows of the normalized matrix XN are calculated on the n eigenvectors, d6) the coordinates of the n columns are calculated on the n eigenvectors.

Advantageously:

during a step d5) the squared cosines of the rows on the n factor axes are calculated, the squared cosines are used to test the weight of the representative factors.

In this case, after the step b), a normalization step c) can advantageously be provided for obtaining a normalized matrix XN in which each element $xn_{ij}$ of row i and column j is weighted by a transform TN using the mean of the values of the elements of the row i and the mean of the elements of the column j, during which normalization step:

c1) the sum $f_i$ of each row of the processing table X is calculated, c2) the sum $f_j$ of each column of the processing table X is calculated, c3) the total sum $f_{tot}$ of the table is calculated, c4) a normalization transform is used to replace each element $x_{ij}$ of the table by the normalized value equal to $x_{ij}$ divided by the product of the square roots of $f_i$ and $f_j$.

In one advantageous embodiment, the invention proposes an auto-adaptive reconstruction method, to eliminate as much high-frequency noise as possible without affecting the quality of the image. The means employed to this end consist in retaining only the variance of the signal and eliminating the variance of the noise. To this end, according to the invention, the reconstruction of a row of the reconstituted table XR is stopped as soon as a sufficient number of factors have been used for the variance of the reconstructed row to be greater than the variance of the original signal from which the estimated variance of the noise has been subtracted.

The test applies particularly well to processing an image affected by Poissonian noise, for example. In this case, one property of Poisson's law is that its mean is equal to its variance:

$$\text{variance }(X)=\text{mean }(X)=\mu$$

As a result of this a good estimate of the variance of the noise is obtained by calculating the mean of the signals from row i.

In another aspect, the invention proposes a device for processing digitized images, comprising a memory, a calculation unit, an input-output device for receiving data constituting a digitized image to be processed, display and/or printing means for viewing the processed image, and a program stored in memory and adapted to execute the method as defined hereinabove.

The invention applies in particular to a medical imaging installation comprising a device of the above kind.

BRIEF DESCRIPTION OF THE DRAWINGS

Other objects, features and advantages of the present invention will emerge from the following description of particular embodiments of the invention given with reference to the appended drawings, in which.

DESCRIPTION OF THE PREFERRED EMBODIMENT

Figure 7:
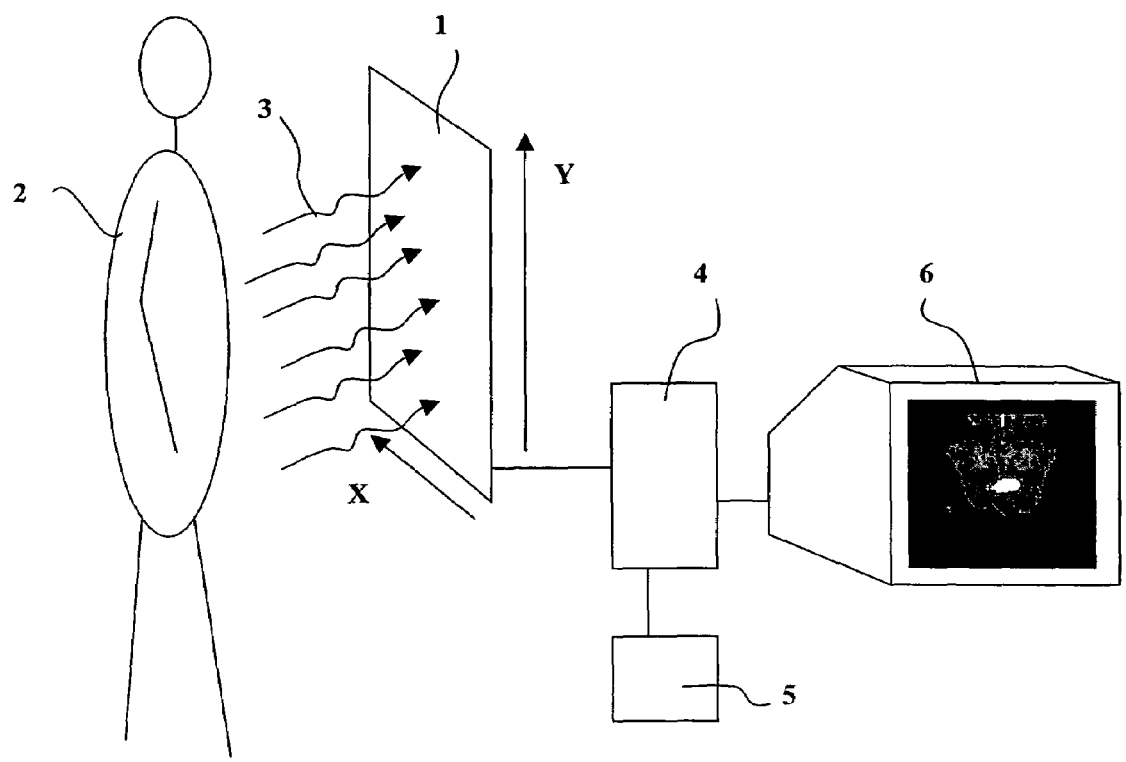
FIG. 7 depicts diagrammatically an imaging installation incorporating an image processing device according to the invention.

Consider first FIG. 7, which depicts diagrammatically a medical imaging installation comprising a gamma ray sensor 1 such as a gamma camera moving in two directions in front of the subject 2 to be observed, and capturing gamma rays 3 emitted by radio-emissive particles injected beforehand into the body of the patient 2. The gamma ray sensor 1 sends to a calculation unit 4 the sequence of photon image signals received on each basic region or pixel of the gamma ray sensor 1, the calculation unit 4 storing in a memory 5 the number of photons for each pixel, corresponding to the intensity of the pixel. The memory 5 therefore contains a digitized image consisting of a table T of numbers x (i, j) each expressing the number of photons detected (or degree of luminosity) of a pixel from the row i and the column j of the observed region 1. According to the invention, the installation further comprises a program stored in the memory 5 and driving the calculation unit 4 to filter the image digitized in the above manner and to produce on a display or printing device 6 a filtered image of high quality from which high-frequency noise has been extracted.

An image filtering method according to one embodiment of the present invention is described next, with reference to FIG. 5.

Note the table T already referred to and constituting the digitized image. In practice, digitized images contain a large number of pixels. To simplify the explanation, a square image is considered that comprises 8×8 pixels, each pixel being depicted by a small square.

The first operation a) of the noise reduction method according to the invention consists in decomposing the table T into a continuous series of p basic tables of the same size, each comprising n pixels. In the example depicted in FIG. 5, four basic tables T1, T2, T3 and T4, each having 16 pixels, are considered.

Then, in a step b), the data from the sequence of basic tables T1-T4 is arranged in a processing table X of p rows and n columns, each row i being formed of the ordered sequence of the pixels of the basic table of rank i. Thus pixels 1 to 16 from the table T1, stored in order, are repeated in the first row of the table X. Similarly, the pixels stored in order from the table T2 are repeated in the second row of the table X, and so on. Thus, in this example, the processing table X has four rows each of 16 columns.

Figure 5:
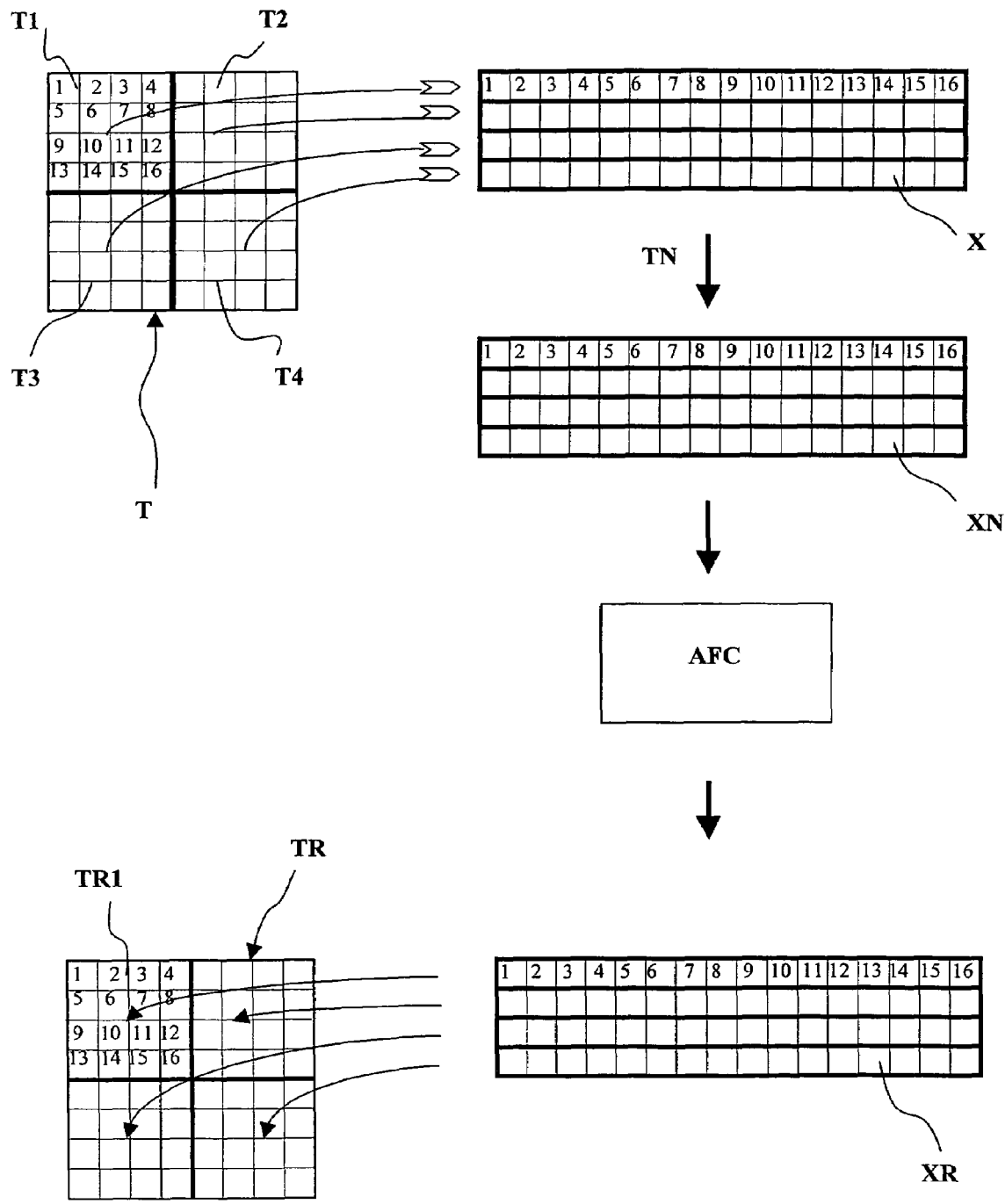
FIG. 5 depicts the main steps of a filtering method according to the present invention.

In the FIG. 5 example, the table T is decomposed into four square basic tables T1-T4. However, without departing from the scope of the invention, the table T may be divided into a sequence of rectangular tables of the same size.

Then, in a step c), the processing table X is normalized to obtain a normalized matrix Xn in which each element $xn_{ij}$ in row i and column j is weighted by a transform using the mean of the values of the elements of the row i and the mean of the elements of the column j. One example of a normalization transform TN is described later.

Then, in the step d), AFC statistical factor analysis processing is applied to the normalized matrix XN, taking the j columns as the variables, to extract therefrom n representative orthogonal factors.

Factor analysis of correspondences is used, for example, in which:

d1) the transposed matrix $XN^T$ is calculated, d2) the square matrix that is the product of the normalized matrix XN and the transposed matrix $XN^T$ is calculated, d3) the square matrix $XN^TXN$ is diagonalized to extract therefrom n eigenvectors $u_k$ (with k from 1 to n) associated with n eigenvalues $vp_k$, d4) the coordinates of the p rows of the normalized matrix XN are calculated on the n eigenvectors, d5) the squared cosines of the p rows of the n factor axes are calculated, d6) the coordinates of the n columns are calculated on the n eigenvectors.

During a step e), the n factors are then stored in decreasing order as a function of their respective weights.

During a step f), a reconstituted processing table XR of numbers xr (i, j) is generated using only the first q representative factors and restoring the original values of the pixels by means of a transform that is the inverse of the normalization transform TN.

Finally, the reconstituted table TR is generated, constituting the reconstituted digitized image, in which high-frequency noise, for example Poissonian statistical noise, has been reduced.

In one embodiment, the step c) may apply normalization by means of the following steps:

c1) the sum $f_i$ of each row of the processing table X is calculated, c2) the sum $f_j$ of each column of the processing table X is calculated, c3) the total sum $f_{tot}$ of the table is calculated, c4) a normalization transform is used to replace each element $x_{ij}$ of the table by the normalized value equal to $x_{ij}$ divided by the product of the square roots of $f_i$ and $f_j$.

In practice, the step d4) of calculating the coordinates of the p rows of the normalized matrix XN on the n eigenvectors may be executed by calculating coordinate $c_k(i)$ of the row i on the axis k generated by the eigenvector $U_k$ using the formula:

$$c_k(i) = f_{tot}^{1/2} \sum_{j=1}^{n} \frac{x_{ij}}{(f_i f_j)^{1/2}} u_k(j)$$

in which $u_k(j)$ is the $j^{th}$ coordinate of the eigenvector $u_k$.

The squared cosine may be calculated, according to the step d5), using the formula:

$$\cos^2{}_k(i) = c_k(i) c_k(i)$$

The coordinates of the n columns of the n eigenvectors may be calculated during a step d6) from the coordinate $d_k(j)$ of the column j on the eigenvector of axis k using the formula:

$$d_k(j) = \frac{1}{vp_k^{1/2}} \sum_{i=1}^{p} \frac{x_{ij}}{f_j} c_k(i)$$

in which $vp_k$ is the eigenvalue associated with the eigenvector $u_k$.

During the step e), the n factors can advantageously be classed as a function of their squared cosine by applying the above formulas.

According to the invention, the reconstitution of the reconstituted processing table xr is effected independently row by row, taking into account only the q factors having the maximum squared cosine for the row i.

Assuming that the first q factors are taken into consideration, the reconstructed value $xr_{ij}(q)$ of the element of the reconstituted processing table XR in row i and column j is calculated from the formula:

$$xr_{ij}(q) = \frac{f_i f_j}{f_{tot}} \sum_{k=1}^{q} \frac{c_k(i) d_k(j)}{vp_k^{1/2}}$$

From the reconstituted processing table XR, in FIG. 5, the reconstituted table TR is reconstructed row by row, the first row of the reconstituted processing table XR constituting the pixels of the first basic table TR1, and so on.

According to the invention, the aim is to automate the adaptation of the filtering device to the content of the image. This automation is effected for each region of the image corresponding to one of the basic tables T1 to T4. To this end the reconstituted table XR is reconstructed row by row. Reconstructed values $xr_{ij}$ of a row i of elements of the reconstituted table XR are calculated step-by-step:

the values of the elements $xr_{ij}$ are calculated successively for increasing values q of the number of factors taken into account, the residual variance of the row i is calculated each time, the residual variance is compared to the estimated variance of the noise to be reduced, and the calculation for the row i is stopped when the residual variance of the row i is no longer statistically greater than the estimated variance of the noise of the row i in the starting image, thus obtaining an estimated final image Im_final.

In practice, the residual variance var_res(q) is calculated as the difference between the initial variance of the row i of the processing table X and the reconstituted variance var_rec (q) or variance of the row i of the reconstituted processing table XR:

var_res(q)=var_ini−var_rec(q)

The test of comparing the residual variance and the estimated variance of the noise may advantageously be effected by:

a) calculating the variable t using the formula:

t=(Var_noise)xhi(ddl)/ddl in which xhi (ddl) is the value given by the $\chi^2$ table for a risk of 5% and a number ddl of degrees of freedom, ddl is the number of degrees of freedom, with ddl=n−q−1 q is the number of factors taken into account, b) stopping reconstruction when the residual variable Var_res(q) is less than t.

If the method is applied to processing an image subject to Poissonian noise, the estimated variance of the noise of the row i is taken as equal to the average of the elements $x_{ij}$ of the row i of the processing table X.

Figure 6:
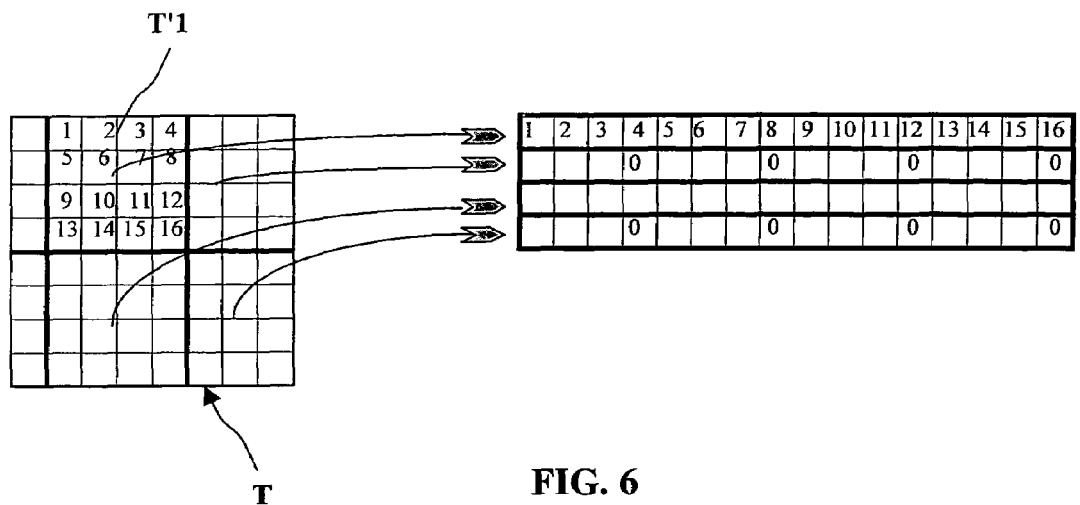
FIG. 6 depicts an offsetting principle used in the method of the invention to limit edge effects.

To reduce the effect of noise on the results, the procedure described above is repeated several times on the same image, shifting the decomposition into basic tables by one pixel each time. FIG. 5 depicts the first procedure for an offset of 0 in x and 0 in y. FIG. 6 depicts the second procedure for an offset of 1 pixel in x and 0 pixels in y: the basic table T'1 is offset by 1 pixel toward the right in the table T. For a decomposition into 4×4 squares, for example, the procedure is executed 16 times, with offsets in x from 0 to 3 and offsets in y from 0 to 3. The final image (Im_final), estimated without noise, is the mean of the 16 resulting images.

This mean can take into account the number of times each pixel of the image is actually included in the AFC factor analysis of correspondences processing, in order not to cause edge effects. Another advantage of repetition is circumventing geometrical artifacts that may appear because of the decomposition into basic rectangles.

An advantageous embodiment of the invention further chooses the level of elimination of noise, subtracting from the original image only a portion of the noise image, to obtain a so-called reduced image im_reduced. The image of the noise im_noise is the original image subtracted from the final image. Accordingly, a reduced image Im_reduced is produced in which the noise is partially eliminated by the following steps:

calculating the image of the noise Im_noise as the difference between the original image and the final image:

Im_noise=Im_original−Im_final partially adding the image of the noise to the final image:

Im_reduced=Im_final+αIm_noise

α may range from 0 (total elimination of the noise) to 1 (no elimination of the noise).

Figure 1:
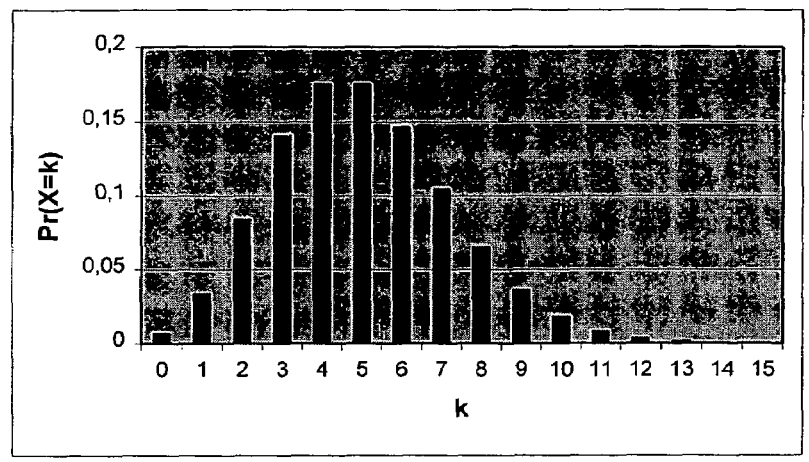
FIG. 1 depicts a Poissonian distribution with a mean equal to 5.
Figure 2:
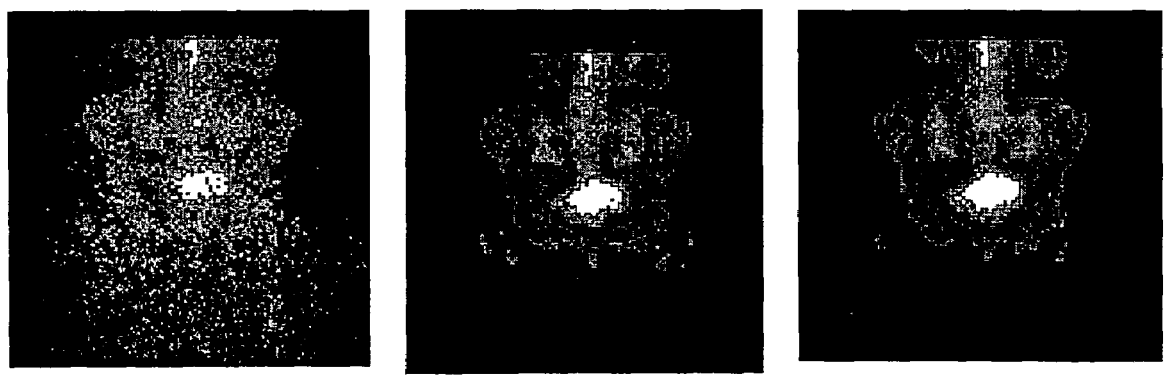
FIG. 2 depicts the improvement of an image by increasing the duration of observation of a Poissonian phenomenon.
Figure 3:
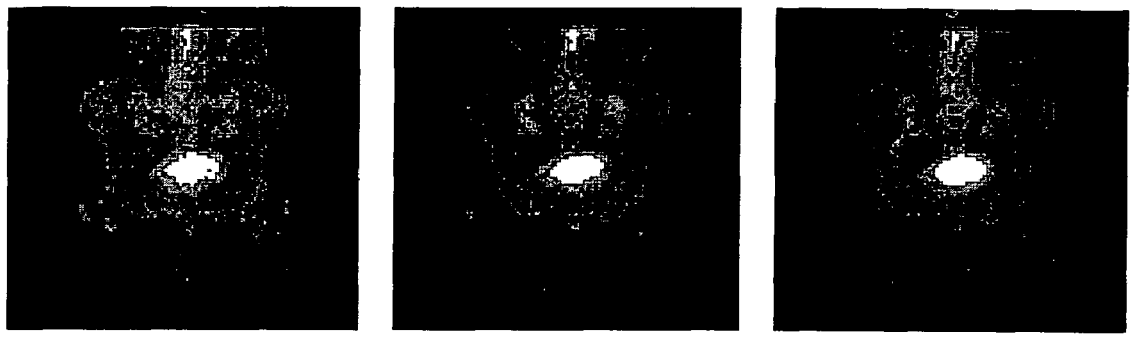
FIG. 3 depicts results obtained by prior art weighted or median filters.
Figure 4:
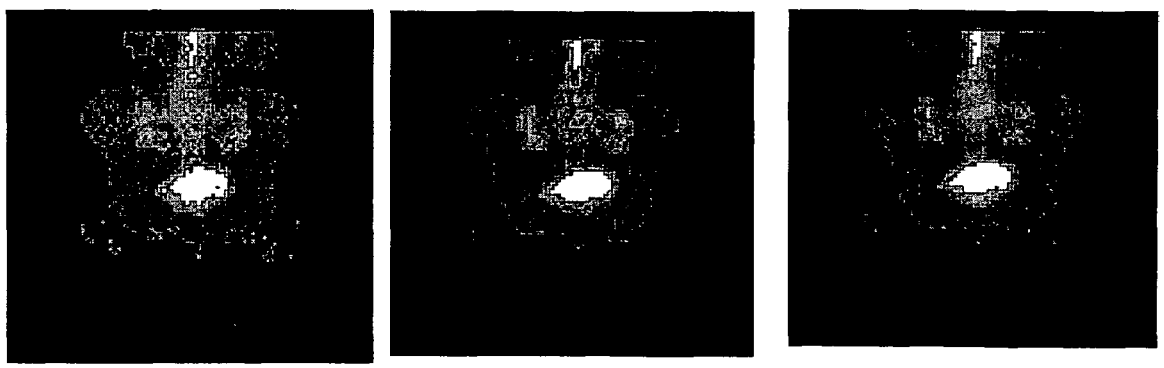
FIG. 4 depicts the result that may be obtained with one embodiment of a filter according to the invention.

FIG. 4 depicts the result of filtering in accordance with the invention: the left-hand view is the original image; the middle view is the final image with the optimum filtering; the right-hand view is the reduced image, with α=⅓.

The present invention is not limited to the embodiments explicitly described and encompasses variants and generalizations thereof within the scope of the following claims.

The invention claimed is:

1. Method of processing a digitized image consisting of a table T of numbers $x_{(ij)}$ each expressing the degree of luminosity of a corresponding pixel (i, j), the method comprising the reduction of high-frequency noise by the following steps:
   a) decomposing the table T into a continuous series of p basic tables of the same dimensions each having n pixels,
   b) ordering the data from the series of basic tables into a processing table X of p rows and n columns, each row i being formed of the ordered sequence of the pixels from the $i^{th}$ basic table,
   d) effecting a multivariate statistical analysis on the processing table X, considering the n columns as variables, to extract therefrom n representative factors,
   f) generating a reconstituted processing table XR of numbers $xr_{(i, j)}$ using only the first q representative factors and restoring the absolute degree of luminosity, then generating a reconstituted table TR constituting the reconstituted digitized image in which the high-frequency noise has been reduced in this way,
   wherein:
   g) during the step f), the reconstituted processing table XR is reconstituted by reconstructing each row i independently of the others, taking into account only the factors having a meaningful weight with the row i,
   h) after the step b), a normalization step is provided for obtaining a normalized matrix XN in which each element $xn_{ij}$ of row i and column j is weighted by a transform TN using the mean of the values of the elements of the row i and the mean of the elements of the column j,
   i) the step d) uses a method of factorial analysis of correspondences, whereby:
   d1) the transposed matrix $XN^T$ is calculated,
   d2) the square matrix that is the product of the normalized matrix XN and the transposed matrix $XN^T$ is calculated,
   d3) the square matrix $XN^TXN$ is diagonalized to extract therefrom n eigenvectors $u_k$ (with k from 1 to n) associated with n eigenvalues $vp_k$,
   d4) the coordinates of the p rows of the normalized matrix XN are calculated on the n eigenvectors,
   d6) the coordinates of the n columns are calculated on the n eigenvectors,
   and wherein, during a step d5) the squared cosines of the rows on the n factor axes are calculated, and
   the squared cosines are used to test the weight of the representative factors in the row i.

2. Method according to claim 1 wherein, during the normalization step:
   c1) the sum $f_i$ of each row of the processing table X is calculated,
   c2) the sum $f_j$ of each column of the processing table X is calculated,
   c3) the total sum $f_{tot}$ of the table is calculated,
   c4) a normalization transform is used to replace each element $x_{ij}$ of the table by the normalized value equal to $x_{ij}$ divided by the product of the square roots of $f_i$ and $f_j$.

3. Method according to claim 2 wherein:
   the step d4) calculates the coordinate $c_k(i)$ of the row i on the axis k generated by the eigenvector $u_k$ using the formula:

$$c_k(i) = f_{tot}^{1/2} \sum_{j=1}^{n} [x_{ij}/(f_i f_j)^{1/2}] u_k(j)$$

in which $u_k(j)$ is the $j^{th}$ coordinate of the eigenvector $u_k$;
the step d5) calculates the squared cosine using the formula:

$$\cos^2{}_k(i) = c_k(i) c_k(i)$$

the step d6) calculates the coordinate $d_k(j)$ of the column j on the eigenvector of axis k using the formula:

$$d_k(j) = (1/vp_k^{1/2}) \sum_{i=1}^{p} [x_{ij}/f_j] c_k(i)$$

in which $vp_k$ is the eigenvalue associated with the eigenvector $u_k$.

4. Method according to claim 3 wherein the reconstructed value $xr_{ij}(q)$ of the element of the reconstituted processing table XR of row i and column j taking into account the q appropriate factors is calculated using the formula:

$$xr_{ij}(q) = (f_i f_j)/f_{tot} \sum_{k=1}^{q} (c_k(i) d_k(j))/vp_k^{1/2}.$$

5. Method according to claim 1, wherein reconstructed values $xr_{ij}$ of a row i of elements of the reconstituted table XR are calculated step by step, by successively calculating the value of the elements of the row for increasing values q, calculating each time the residual variance (var_res(q)) of the row i, comparing it to the estimated variance of the noise to be reduced, and stopping the calculation for the row when the residual variance of the row is no longer statistically greater than the estimated variance of the noise of the row i in the starting image, thereby obtaining a final estimated image (Im_final) free of noise.

6. Method according to claim 5 wherein the residual variance Var_res(q) of the row i reconstituted with the q factors is calculated as the difference between the initial variance Var_ini of the row i of the processing table X and the reconstituted variance Var_rec(q) or variance of the row i of the reconstituted processing table XR.

7. Method according to claim 5 wherein the, test of comparing the residual variance and the estimated variance of the noise is effected by:
   a) calculating the variable t using the formula:

$t=(\text{Var\_noise})xhi(ddl)/ddl$ in which xhi (ddl) is the value given by the table of $\chi^2$ for a risk of 5% and a number ddl o f degrees of freedom, with
   ddl is the number of degrees of freedom, $ddl=n-q-1$ q being the number of factors taken into account,
   b) stopping the reconstruction when the residual variance Var_res(q) is less than t.

8. Method according to claim 5, applied to the processing of an image affected by Poissonian noise, wherein the estimated variance of the noise of row i of the processing table X is taken as equal to the mean of the elements $x_{ij}$ of the row i.

9. Method according to claim 5, wherein a reduced image (Im_reduced) is produced in which the noise is partially eliminated, by the step:

calculating the image of the noise (Im_noise) as the difference between the original image and the final image:

$Im\_noise = Im\_original = Im\_final$ adding in part the image of the noise to the final image:

$Im\_reduced = Im\_final + \alpha Im\_noise.$

10. Method according to claim 1 wherein the method is applied a plurality of times to the same image with an offset each time of one pixel of the decomposition into basic tables, and calculating the mean of the reconstituted images thus obtained.

11. Digitized image processing device, comprising a memory, a calculation unit, an input-output device for receiving data constituting a digitized image to be processed, display and/or printing means for viewing the processed image, and a program stored in memory and adapted to execute the method according to claim 1.

12. Medical imaging installation comprising a device according to claim 11.

* * * * *

UNITED STATES PATENT AND TRADEMARK OFFICE
CERTIFICATE OF CORRECTION

PATENT NO. : 7,376,283 B2
APPLICATION NO. : 10/497254
DATED : May 20, 2008
INVENTOR(S) : Pascal Hannequin It is certified that error appears in the above-identified patent and that said Letters Patent is hereby corrected as shown below:

In Claim 7, line 1 (column 10, line 52), delete the comma between "the" and "test".

In Claim 7, line 7 (column 10, line 59), delete "o f" and insert instead --of--.

In Claim 7, line 8 (column 10, line 60), delete "with".

In Claim 7, line 9 (column 10, line 61), after "degrees of freedom," insert --with--.

In Claim 9, line 7 (column 11, line 12), delete "Im_noise=Im_original = Im_final" and insert instead --Im_noise=Im_original - Im_final--.

Signed and Sealed this

Third Day of March, 2009

JOHN DOLL
*Acting Director of the United States Patent and Trademark Office*